United States Patent [19]

Rines et al.

[11] Patent Number: 4,509,458
[45] Date of Patent: Apr. 9, 1985

[54] PROCESS OF SEA-RANCHING SALMON AND THE LIKE

[75] Inventors: Robert H. Rines; Albert H. Knowles, both of Concord, N.H.

[73] Assignee: K. R. Associates, Inc., Concord, N.H.

[21] Appl. No.: 427,950

[22] Filed: Sep. 29, 1982

[51] Int. Cl.³ .............................................. A01K 61/00
[52] U.S. Cl. ................................................................ 119/3
[58] Field of Search ................................................ 119/3

[56] References Cited

U.S. PATENT DOCUMENTS

| | | | |
|---|---|---|---|
| 3,777,709 | 12/1973 | Anderson et al. | 119/3 |
| 4,271,788 | 6/1981 | Knowles | 119/3 |
| 4,287,852 | 9/1981 | Rines | 119/3 |

OTHER PUBLICATIONS

World Conference on Aquaculture and International Trade Show, Cini Foundation, Venice, Italy, Sep. 1981.
Salmon Ranching Pacific Fishing, Jul. 1982.
The New England Atlantic Salmon Program, United States Fish and Wildlife Service, 1981.
W. J. McNeil et al., "Salmon Rancher's Manual", Jul. 1975, pp. 60–68 and 71.

*Primary Examiner*—Hugh R. Chamblee
*Attorney, Agent, or Firm*—Rines and Rines, Shapiro and Shapiro

[57] ABSTRACT

This disclosure is concerned with improvements in releasing fresh-water salmon smolt and the like into the sea following periods of salt-water imprinting and maturation in the region of desired sea-return.

11 Claims, No Drawings

PROCESS OF SEA-RANCHING SALMON AND THE LIKE

The present invention relates to improvements in processes of sea-ranching fish, such as salmon and the like, that have initial fresh-water growth in rivers or in man-made fresh water smolt farms, as from egg to fry, to parr and to smolt stage (where the salmon or the like is ready to adapt to salt-water), and then, in nature and in most sea-ranching techniques, travel in the rivers down to the sea, returning one or more years later as mature spawning fish to the same rivers.

The fractional or very few percent return of salmon in sea-ranching efforts on both coasts of the United States (coho and other Pacific salmon) reported, for example, in Pacific Fishing—July, 1982, pgs. 39–45 and Atlantic salmon reported from tests of the U.S. Fish and Wildlife Service, (Progress Report—The New England Atlantic Salmon Program—1980 and continuing—p. 8), unfortunately leaves a lot to be desired for more effective conservation and off-shore commercial fishing and sports fishing, and for potential commercial sea-ranching purposes. Among the factors involved in this situation are the loss of smolt in the rivers before reaching the sea, because of inadequate size, poor physical condition, predators, or river water problems and the like; and poor survival upon introduction to the salt water for similar causes and, in the case of pellet-fed fish-farm smolt, perhaps difficulty in adjusting to natural feed in the sea.

It is to the improvement of such salt-water introduction and sea-ranching return that the present invention is accordingly directed, it being an object of the invention to provide a new and improved process of sea-ranching that provides a better chance of smolt survival, a more positive imprinting of the region of release, and thus a more probable return from the sea.

A further object is to provide a novel fish ranching process and an improved fresh-to-salt water transition process of more general applicability as well.

Other and further objects will be described hereinafter and are more particularly pointed out in the appended claims.

In summary, from one of its broader aspects, the invention embraces a process of sea-ranching salmon and the like, that comprises, rearing fry through to the smolt stage in fresh water; transferring the smolt directly to confined salt-water holding volumes located at a region where sea-ranch return is desired such as where a river empties into the sea; feeding the smolt in such volumes over periods of time not only sufficient to imprint said region upon the smolt for sea-return purposes but also sufficient to enable substantial growth in the salt water over the size at the time of introduction into the said salt-water holding volumes and to generate a sufficient size to minimize predation by other fish; and thereafter releasing the smolt to the sea. The process also enables, where desired, releasing the smolt in groups at successive times extending over months; and also the flexibility for providing both sea-ranching return and salt-water fish-farmed salmon or the like at the same region, with the effluent of the latter assisting in the imprinting and return attraction of the former. Preferred and best mode details are later presented.

The process of the invention being readily susceptible to verbal description alone, it is not deemed necessary or useful to provide illustrative drawings, particularly since confined fish-holding pools, ponds, cages, etc., referred to herein as holding volumes, are so well known in this art. The invention, furthermore, will be described with reference to salmon, as of the before-mentioned Atlantic and Pacific species, but it will be evident that the process has utility with other types of salmonids and similar fish having similar or related growth characteristics, sometimes hereinafter generically referred to and embraced by expressions such as salmon and the like.

The before-cited articles and discussion demonstrate the problems of smolt introduction into rivers by man, or smolt development in rivers by nature, for ultimate passage to the sea, wild growth in the sea, and homing return to the rivers of release for spawning. In connection with fish-farm-produced smolt, reference may be made to U.S. Pat. Nos. 4,271,788 and 4,287,852 and to an article entitled "Environmental Conditioning Process for Accelerating and Controlling the Development of Salmon Smolt and Subsequent Salt-Water Maturation in Ponds and Cages", A. H. Knowles and R. H. Rines, appearing in the Contributed Papers Summaries, World Conference on Aqua-Culture, Venice, Italy, 21–25 September, 1981, page 49. The improved processes for rearing fry with smolting control described in these references employs opaque water-surface-contacting light opaque covers extending over a substantial area of the surface of the fresh water volumes holding the fish, with feed applied in contrastingly illuminated regions (illuminated beyond daylight hours, if desired, even up to 24 hours) adjacent the covers and the dark fish-stacking volumes created immediately below the covers in which the fish stack and live against the circulating water current, darting into the illuminated regions for the feed and returning to their places in the dark volume. Accelerated growth rates and densities, including acceleration and control of smolting, as well as consistently immaculate and strong smolt result from this process.

In accordance with the invention, smolt of this character or other smolt are not released in the fresh-water river related to their raising to find their way to the sea; but, to the contrary, are transported to or otherwise directly to confined salt-water holding volumes located at a region, say, where that river mouth empties into the sea. There the smolt are deliberately held in salt water and are fed over a period of time sufficient not just to imprint such region where sea-ranch returns is desired, but also to enable substantial feeding and growth in the salt water to sizes substantially greater than the initial fresh-water smolt size at the time of introduction into the salt-water holding volumes. Initial experiments have indicated the desirability, as later delineated, of at least a month and preferably several months of such confined salt-water growth.

An added feature for possibly easing the transition to wild feeding that may be incorporated, is to supplement or convert from the pellet-type feed used in the fresh-water development of the farmed smolt, or the river type feed of the wild smolt, to components of feed of the type the fish will later have to survive on in the sea (shrimp, plankton, squid, etc.).

The salt-water-imprinted, salt-water-adapted, and increased-growth smolt are then released to the sea with an improved survival and return potential. This release may be effected over a period of time extending over months of the year, particularly in view of the apparently almost indefinite smolt-condition holding phenomenon enabled by the process described in the above patents and in U.S. patent application, Ser. No. 334,742, filed Dec. 28, 1981. Such water-contacting or floating opaque cover technique may be used also in the salt-water ponds or cages or other volumes for continued accelerated growth and conditioning.

In a preferred form of practice of the invention, the same salt-water region of sea-ranching release is selected also as a fish-farm, with some of the smolt continually raised or matured there into full-grown salmon (in salt-water fed ponds ashore or in sea cages or the like) such that said region is permeated with the effluent of the farm—aiding in the strength of initial imprint on the smolt that are to be released for sea-ranching and the attractant to return from the sea to said region. If this feature of the invention is employed, moreover, the added advantage is attained that a choice (for marketing, brood stock and other purposes) of wild salmon (sea-ranched) or cultivated salmon is made available from common fry or egg stock.

In tests at the Plum Island U.S. Coast Guard salt-water fish-farm site of New England Fish Farming Enterprises Inc., fresh-water Atlantic smolt of average 45-gram size range (raised under the process of said patents at Bristol, N.H. at the Newfound River which flows into the Merrimack River and then to the sea at Plum Island) were directly introduced into 40-foot beach-based salt-water ponds in May. The effluent of the farm at Plum Island well marks that region just beyond the river mouth of the Merrimack River. These smolt were held in fresh-water, following smolting, under the before-mentioned covers, with continual feeding for from one to three months before transfer to salt-water and continued their growth and strength without reverting to parr characteristics as a result of the continued holding under the covers. This enables a much stronger smolt to be available for the salt-water holding, and is preferred. By August, these smolt were not only well adapted to the salt water of that region, but had attained an average size of 170 grams, providing an even stronger potential survivor for ranching release to the ocean at Plum Island. The release may be timed to those days when there is the most abundant natural feed in the proximal sea areas; and, as before stated, may be effected in groups at successive times.

In two-months of salt-water holding and feeding at Plum Island after direct introduction from fresh-water smolt development at said Bristol, coho smolt of an average of 35 grams had totally become salt-water oriented and of 180 grams in average weight. The smolt had been held in fresh water (after initial smolting) under the said covers for several months before transfer to Plum Island.

Further modifications will occur to those skilled in this art and such are considered to fall within the spirit and scope of the invention as defined in the appended claims.

What is claimed is:

1. A process of sea-ranching salmon and the like, that comprises, rearing fry through to the smolt stage in fresh water; transferring the smolt directly to confined salt-water holding volumes located at a region where sea-ranch return is desired such as where a river empties into the sea; feeding the smolt in such volumes over periods of time not only sufficient to imprint said region upon the smolt for sea-return purposes but also sufficient to enable substantial growth in the salt water over the size at the time of introduction into the said salt-water holding volumes; holding some of said smolt in such volumes at said region continually over extended periods of time sufficient for such smolt to reach maturity at the same region while other smolt in such volumes are released to the sea for ranching; the effluent from said volumes being continually present at said region, assisting not only in the initial imprinting of the smolt-to-be-released to the sea but also in attracting the subsequent sea return of the released smolt to said region.

2. A process as claimed in claim 1 and in which the first period of time of feeding before release is at least about a month.

3. A process as claimed in claim 1 and in which said feeding includes introducing feed of the type later encountered by the fish at sea.

4. A process as claimed in claim 1 wherein both sea-ranched salmon and fish-farmed salmon from the same fry and smolt stock are made available at said region for selective marketing, brood stock and other purposes.

5. A process as claimed in claim 1 and in which said fresh water is derived from water related to said river.

6. A process as claimed in claim 1 and in which at least one of said rearing and feeding steps is carried out under water-surface-contacting light opaque covers extending over a substantial area of the surface of the water volumes holding the fish, with feed applied in contrastingly illuminated regions adjacent the covers and the dark fish-stacking and circulating volumes created immediately therebelow.

7. A process as claimed in claim 6 and in which said covers are used in both said fresh-water rearing and salt-water feeding steps.

8. A process as claimed in claim 1 and in which smolt are released in groups at successive times extending over at least several months.

9. A process as claimed in claim 8 and in which said intervals of release occur over a substantial portion of the year.

10. A process as claimed in claim 1 or claim 3 and in which the releasing of the smolt to the sea is timed with the advent of an abundance of natural feed in the sea proximal to the release region.

11. A process of combined sea-ranching and fish-farming of salmon and the like, that comprises, maturing smolt in confined salt-water holding volumes at a predetermined region of the seaside where sea-ranch return is desired such as where a river empties into the sea; feeding the smolt in such volumes over periods of time not only sufficient to imprint said region upon the smolt for sea-return purposes but also sufficient to enable substantial growth in the salt-water over the size at the time of introduction into said salt-water holding volumes; passing the effluent of said volumes to said predetermined region; and releasing a part of the smolt at said region for continued sea maturation and later return-ranching at said region while continuing maturing another part in said holding volumes to provide both wild and cultivated salmon.

* * * * *